3,553,160
HEAT STABLE METHACRYLONITRILE METHACRYLIC ACID COPOLYMERS

Günter Schröder, Ober Ramstadt-Eiche, and Wolfgang Philipp Gänzler, Darmstadt, Germany, assignors to Rohm & Haas G.m.b.H., Darmstadt, Germany
No Drawing. Filed Oct. 3, 1967, Ser. No. 672,453
Claims priority, application France, Oct. 6, 1966, 78,977; Dec. 22, 1966, 88,509
Int. Cl. C08f *3/78, 45/62*
U.S. Cl. 260—45.75          3 Claims

ABSTRACT OF THE DISCLOSURE

A method for making heat-stable copolymers of methacrylonitrile and methacrylic acid optionally containing lesser amounts of other copolymerizable olefinically unsaturated comonomers, principally styrene or a lower acrylate, by copolymerizing the monomers and heating the resultant copolymer at 150°–250° C. in the presence of a metal salt additive to improve optical clarity of the copolymers, said salt being a salt of a polyvalent metal and an unsaturated copolymerizable monocarboxylic or dicarboxylic acid.

---

The present invention relates to methods of making heat stable polymers.

It is known in the art to heat copolymers formed from unsaturated carboxylic acids, unsaturated carboxylic acid-nitriles, and predominant quantities of further monomers at temperatures of 100° C.–200° C., whereby carboxyl groups add to nitrile groups present in the copolymer to form cross-linking imide groups of the formula

—CO—NH—CO—

The polymers are rendered insoluble in organic solvents by the cross-linking. However, as the quantity of cross-linking sites increases, the polymers also become brittle and dark-colored. The polymers have been proposed for use as casting materials, adhesives, and as an ingredient of lacquers, but the materials are of no practical significance in these fields.

Because these polymers cross-link at the temperatures necessary for working thermoplastic polymers, they cannot be formed by injection or extrusion processes, but can only be shaped during bulk polymerization, for example into the form of plates or tubes using polymerization processes involving flat molds or centrifugal casting. The preparation of polymers having a large number of cross-linking groups nevertheless entails such considerable difficulties that those skilled in the art have until now not bothered with the preparation of such products. For example, polymer plates prepared in flat glass molds according to German patent publication 639,095 and having a high number of acrylic acid groups therein adhere so tightly to the glass plates forming the mold that they cannot be loosened without destruction of the glass plates. If acrylonitrile is employed as the nitrile component of a copolymer, polymerization proceeds so vigorously that it is difficult in the laboratory, and impossible in practice, to insure reproducible polymerization and uniform quality. On the other hand, mixtures of methacrylonitrile and acrylic acid, together with optional further monomers, polymerize so slowly in flat molds (5–10 days) that their practical value is negated on this ground alone.

Further difficulties result on heating plates of the prior art polymers at temperatures of 100–200° C. Polymers having a content of more than 30–40 percent of acrylonitrile turn dark brown to black on heating and for this reason are not usable as synthetic plastics. N. Grassie and J. C. McNeill (J. Chem. Soc., London, 1956, page 3929) have investigated the coloring of polymers containing methacrylonitrile and have found that the darkening reaction at temperatures over 100° C. proceeds particularly quickly in the presence of acids, for example methacrylic acid. Because of this state of affairs, it must be considered extremely surprising that the various difficulties described above are not encountered in the preparation of polymers according to the present invention from an unsaturated acid, an unsaturated nitrile, and optional further monomers, which polymers are then cross-linked by heating at temperatures over 100°.

According to the present invention, copolymers are prepared from (A) 100 parts by weight of a mixture containing 40–60 percent by weight of methacrylonitrile and 60–40 percent by weight of methacrylic acid, (B) up to 25 parts by weight of a methacrylic acid ester having 1 to 4 carbon atoms in the alcohol portion and/or styrene and its homologs, and (C) up to 10 parts by weight of a further compound copolymerizable with the monomers mentioned above, by polymerizing these materials in the presence of a free-radical forming polymerization accelerator and then heating the copolymer so obtained at temperatures between about 150° C. and 250° C.

Mixtures of the kind described polymerize in times which are short enough to permit economic manufacture, and yet are long enough to permit withdrawal of the heat of polymerization by conventional means such as a water bath. In general, the materials polymerize in from about 4 hours to about 100 hours at temperatures between about 20° C. and 70° C. According to a preferred embodiment of the invention, polymerization occurs in a flat mold formed by two glass plates and a sealing gasket therebetween, whereby plane polymer plates are obtained. These do not adhere to glass and can be removed from the flat molds without difficulty.

The polymer attains its characteristic properties on heating for from one-half to four hours at about 150° C. to 250° C. At these temperatures, a light yellow to brown coloration appears which as a rule is somewhat weaker than the color of commercial plastics which are copolymers of methyl methacrylate and acrylonitrile. The coloration can be significantly repressed by complementary coloring. The properties of the polymer, as well as the method of making it, can be further improved by carrying out the polymerization of the monomer mixture in the presence of a salt of a polyvalent metal and an unsaturated copolymerizable monocarboxylic or dicarboxylic acid.

The beryllium, magnesium, calcium, strontium, barium, cadmium, zinc, lead, nickel, and cobalt salts of acrylic, methacrylic, itaconic, fumaric, or maleic acids, or of a monoester of itaconic, fumaric, or maleic acids are examples of such salts. In lieu of employing a salt of an unsaturated acid directly, one can form a methacrylate salt in situ by adding a metal compound such as the hydroxide, oxide, carbonate, or acetate to the monomer mixture, providing that the compound is reactive with the unsaturated acid. Since only very minute quantities of the metal salts just described are necessary, salts which are only soluble to a small degree in the monomer mixture can also be employed. Additions of about 0.01 percent of salt, calculated as metal, by weight of the composition, already give a detectable effect, while additions greater than 0.5 percent by weight bring about no further improvement. Metal salts having an oxidizing or reducing effect can disturb the polymerization. The kind and magnitude of the side effects are in part dependent on the kind of polymerization accelerator used.

The polymers prepared using metal salt additives of the type described form completely clear plastics when heated at about 150° to 250° C., whereas without the metal salt addition a slight Tyndall effect is evident. This slight cloudiness may, for example, hinder viewing through a plastic plate if a strong light falls on the plate from the observer's side and the space behind the plate is dark.

On heating a structure of large surface area, such as a plate, at temperatures of about 150°–250° C., warping can occur. This can be avoided by supplementary stretching while the structure is in a thermoplastic condition, or by pressing between plane mold walls while heating. Those polymers comprising a metal salt additive do not show this disadvantage, i.e. they do not warp when heat-treated at temperatures of 150°–250° C. in an unloaded condition, for example when hanging free.

In their behavior to heat, mechanical stress, and corrosion, polymers prepared according to the present invention show unexpected outstanding properties. Their resistance to thermal deformation according to Vicat can reach values of about 200° C., i.e., far over the softening temperature of almost all known plastics. The outstanding mechanical properties are evident from a comparison, in Table I below, of corresponding test values for a commercially available polymethyl methacrylate (product A) and a product (product B) prepared according to the present invention by copolymerizing 50 percent by weight of methacrylonitrile, 40 percent by weight of methacrylic acid, and 10 percent by weight of methyl methacrylate and heating for three hours at 180° C.

TABLE I

| Physical data | Product A | Product B |
|---|---|---|
| Tensile strength (DIN 53,455), kg./cm.$^2$ | 750 | 1,400 |
| Resistance to flexing (DIN 53,452) kg./cm.$^2$ | 1,200 | 1,900 |
| Modulus of elasticity kg./cm.$^2$ | 30,000 | 54,000 |
| Impact toughness-dynstat-test (3 mm.) (DIN 53,453) cm. kg./cm.$^2$ | 4–6 | 10–11 |
| Ball-pressure hardness (DIN 57,302): | | |
| 5/50/10 kg./cm.$^2$ | 1,850 | 3,800 |
| 5/50/60 kg./cm.$^2$ | 1,700 | 3,500 |
| Resistance to heat according to vicat (DIN 53,462) ° C. | 105 | 183 |

The plastics of the present invention are extraordinarily resistant to organic solvents of all types. However, this property cannot be attributed, or only in the slightest degree, to an intermolecular cross-linking, since such a cross-linking should be accompanied by a loss of thermal plasticity. Surprisingly, the plastics of the invention can be thermoplastically formed, that is bent when warm or even deep drawn.

It must be postulated in explanation of this unexpected property that as the number of cross-linkable nitrile and carboxy groups is increased in the polymer, a proportionate number of intermolecular cross-linking sites are not formed. Rather, when there are large numbers of polymer units containing nitrile groups and carboxy groups, the formation of intermolecular imide bridges is inhibited in favor of an intramolecular imide formation between neighboring nitrile and carboxy groups. In this fashion, methacrylimide units of the formula

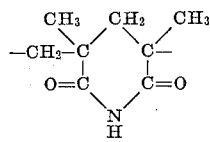

are formed. The absorption bands expected for this structure are evident in the infrared spectrum of the polymers of the invention. In addition to the intramolecular cross-linking forming methacrylimide units, intermolecular cross-linking in smaller proportion will take place between those nitrile groups and carboxy groups which, because of the statistical distribution of the monomers along the polymer chain, are isolated between already-formed cyclic methacrylimide units or units of other monomers present in the copolymer, and which therefore can no longer partake in the formation of cyclic imides of the formula shown.

Polymers principally comprising methacrylimide units are already known in the art. They are, like the polymers hereinbefore described, characterized by a high resistance to deformation by heat. However, in these known polymers, imide groups are formed by condensation reactions with the concurrent splitting off of fugitive compounds such as water, methanol, ammonia, and the like. Because of the need for removing these fugitive compounds from the polymer, no methods have heretofore been available for introducing methacrylimide units into a solid polymer solely by heating.

A better understanding of the present invention and of its many advantages will be had by referring to the following specific examples, given by way of illustration.

In the examples, the composition and properties of several preferred polymers prepared according to the present invention are given, but these do not exhaust the possibilities for variation. For example, instead of methyl methacrylate, ethyl, propyl, butyl, or isobutyl methacrylate can be employed. Instead of styrene, materials such as α-methyl styrene or vinyl toluene can be used. Further monomers, such as acrylamide, methacrylamide, acrylic acid esters, or vinyl acetate, for example, can be present in amounts up to 10 percent by weight based on 100 parts of the mixture of methacrylonitrile and methacrylic acid. The choice of polymerization accelerator and of polymerization conditions, as well as the nature of additives such as UV stabilizers, plasticizers, chain transfer agents, fillers, and dyes and pigments, can all be varied over wide limits.

In the examples, all parts are by weight.

EXAMPLE 1

A mixture of 50 parts of methacrylonitrile, 40 parts of methacrylic acid, 10 parts of methyl methacrylate, and 0.2 part of dibenzoyl peroxide were degassed under vacuum and then kept, in conventional fashion, between two plane glass plates for 24 hours at 60° C. The solid plate formed was subsequently heated in the mold for four hours at 100° C., and then heated outside the mold for a further three hours at 180° C. In this fashion, a clear, yellow plastic plate was obtained, the mechanical properties of which have been given above in Table I (Product B).

EXAMPLES 2–6

In the same manner as described in Example 1, a series of further copolymers was prepared and isomerized by heating for 3 hours at 180° C. The properties are summarized below in Table II.

TABLE II

| | Composition (parts by weight) | | | | | Resistance to deformation by heat according to Vicat, ° C. |
|---|---|---|---|---|---|---|
| | Methacrylo-nitrile | Methacrylic acid | Methyl methacrylate | Styrene | Appearance | |
| Example: | | | | | | |
| 2 | 44 | 36 | 20 | | Yellow, clear | 160 |
| 3 | 49.5 | 40.5 | | 10 | Yellow-brown, clear | 198 |
| 4 | 44 | 36 | 10 | 10 | do | 162 |
| 5 | 50 | 50 | | | Bright yellow, clear | 188 |
| 6 | 60 | 40 | | | do | 191 |

Table II shows that the resistance to deformation by heat of the copolymer can be strongly influenced by certain comonomers. It is important to note that deep-drawing work-ability improves with decreasing resistance to deformation by heat.

EXAMPLES 7–15

0.2 part of dibenzoyl peroxide, together with a metal salt additive shown below in Table III, was dissolved in 100 parts of a mixture comprising 46.7 parts of methacrylonitrile, 38.3 parts of methacrylic acid, and 15 parts of methyl methacrylate.

The mixture was filtered until clear and polymerized at 60° in molds having parallel walls 3 mm. apart. The material was completely polymerized by additional heating for four hours at 100° C.

By heating for three hours at 180° C., the polymer plates are converted to clear plane plates having a high resistance to deformation by heating and a light yellow color, to the extent that this color is not convered by the inherent color of the metal salt added. The resistance to deformation by heat of the samples (according to Vicat) is given in Table III.

TABLE III

| Example | Salts | Parts by weight | Polymerization Time (hours) | Vicat Value (° C.) |
|---|---|---|---|---|
| 7 | MgO | 0.33 | 20 | 172 |
| 8 | Ca(OH)$_2$ | 0.37 | 16 | 173 |
| 9 | Ba(OH)$_2$ | 0.25 | 40 | 172 |
| 10 | ZnO | 0.25 | 24 | 167 |
| 11 | Ni(OCOCH$_3$)$_2$ | 0.6 | 40 | 162 |
| 12 | Pb(OCOCH$_3$)$_2$ | 0.32 | 16 | 164 |
| 13 | Cd(OCOCH$_3$)$_2$ | 0.41 | 16 | 165 |
| 14 | Be(OCOCH$_3$)$_2$ | 2.82 | 40 | 159 |
| 15 | Co(OCOCH$_3$)$_2$ | 0.6 | 40 | 167 |

EXAMPLES 16–26

0.2 part of dibenzoyl peroxide and an amount of a metal salt as set forth in Table IV below were dissolved in 100 parts of a mixture of 55 parts of methacrylonitrile and 45 parts of methacrylic acid.

The mixtures were filtered clear and polymerized at 60° C. in molds having parallel walls 3 mm. apart. The polymerization time was that shown in Table IV. These polymers were tempered for four hours at 100° C. and were then converted by further heating at 180° for three hours to a clear, plane plate material of high resistance to deformation by heat. The materials are yellow to brown in color, to the extent that this color is not covered by the inherent color of the added metal salt. The Vicat softening point of the plates obtained is also given in Table IV.

TABLE IV

| Example | Salts | Parts by weight | Polymerization Time (hours) | Vicat Value (° C.) |
|---|---|---|---|---|
| 16 | MgO | 0.17 | 24 | 197 |
| 17 | MgO | 0.33 | 24 | 199 |
| 18 | Ca(OH)$_2$ | 0.19 | 24 | 191 |
| 19 | Ca(OH)$_2$ | 0.37 | 24 | 192 |
| 20 | Ba(OH)$_2$ | 0.25 | 40 | 192 |
| 21 | Ni(OCOCH$_3$)$_2$ | 0.6 | 40 | 190 |
| 22 | Pb(OCOCH$_3$)$_2$ | 0.32 | 40 | 192 |
| 23 | Pb(II) methacrylate | 0.39 | 40 | 190 |
| 24 | Cd(OCOCH$_3$)$_2$ | 0.41 | 40 | 192 |
| 25 | Be(OCOCH$_3$)$_2$ | 2.82 | 24 | 188 |
| 26 | Co(OCOCH$_3$)$_2$ | 0.6 | 24 | 189 |

EXAMPLE 27

0.25 part of zinc oxide and 0.2 part of dibenzoyl peroxide were dissolved in a mixture of 55 parts of methacrylonitrile and 45 parts of methacrylic acid after the addition of 1.5 parts of water.

The solution was filtered clear and polymerized for 24 hours at 60° in molds having parallel walls 3 mm. apart. Polymerization was completed by heating for four hours at 100° C.

On heating for three hours at 180° C. these polymer plates were converted into plane, clear, yellow plates having a resistance to deformation by heat of 195° C. according to Vicat.

What is claimed is:

1. In the method of making a copolymer having high resistance to deformation by heat by first copolymerizing, in the presence of a free radical polymerization accelerator, (A) 100 parts by weight of a mixture containing 60–40 percent by weight of methacrylonitrile and 40–60 percent by weight of methacrylic acid; (B) 0 to 25 parts by weight of a member selected from the group consisting of a methacrylic acid ester of an alcohol having 1 to 4 carbon atoms, styrene, and an alkyl-substituted styrene; and (C) 0 to 10 parts by weight of a further olefinically unsaturated compound copolymerizable therewith, and then heating the resulting copolymer at a temperature between 150° C. and 250° C., the improvement wherein optically clear products are prepared by copolymerizing in the presence of a salt formed between a polyvalent metal and an olefinically unsaturated copolymerizable acid component selected from the group consisting of acrylic, methacrylic, itaconic, fumaric, and maleic acids and mono-esters of itaconic, fumaric, and maleic acids, said polyvalent metal being selected from the group consisting of beryllium, magnesium, calcium, strontium, barium, cadmium, zinc, lead, nickel, and cobalt.

2. The method as in claim 1 wherein from 0.01 percent to 0.5 percent of salt, calculated as metal, by weight of the composition, is present.

3. The method as in claim 1 wherein said copolymerizable compound (C) is a member selected from the group consisting of acrylamide, methacrylamide, acrylic acid esters, and vinyl acetate.

References Cited

UNITED STATES PATENTS

| 2,759,910 | 8/1965 | Milne | 260—80.5 |
| 2,768,151 | 10/1956 | Schulken | 260—45.85 |
| 2,778,283 | 1/1957 | Bettoli | 260—80.5 |
| 2,851,444 | 9/1958 | Wesp | 260—80.8 |
| 3,056,170 | 10/1962 | Hendricks | 234—231 |
| 3,325,444 | 6/1967 | Best | 260—45.7 |

DONALD E. CZAJA, Primary Examiner

V. P. HOKE, Assistant Examiner

U.S. Cl. X.R.

260—45.7, 45.85, 80.73, 80.8, 85.5